United States Patent
Deconinck (10) Patent No.: US 7,370,840 B1
(45) Date of Patent: May 13, 2008

(54) LAPTOP COMPUTER SECURITY RETAINER DEVICE

(75) Inventor: Joseph Deconinck, West Babylon, NY (US)

(73) Assignee: Protex International Corp., Bohemia, NY (US)

( * ) Notice: Subject to any disclaimer, the term of this patent is extended or adjusted under 35 U.S.C. 154(b) by 330 days.

(21) Appl. No.: 11/073,552

(22) Filed: Mar. 7, 2005

(51) Int. Cl.
*A47G 1/10* (2006.01)
*A47B 97/00* (2006.01)

(52) U.S. Cl. .................. 248/316.1; 248/500; 248/553

(58) Field of Classification Search ............ 248/316.1, 248/551, 500, 505, 552, 553, 309.1, 310, 248/316.8, 680, 681, 154
See application file for complete search history.

(56) References Cited

U.S. PATENT DOCUMENTS

| | | | |
|---|---|---|---|
| 5,052,651 A | 10/1991 | Guddee | |
| 5,135,197 A * | 8/1992 | Kelley et al. | 248/551 |
| 5,351,508 A | 10/1994 | Kelley | |
| 5,447,044 A | 9/1995 | Cheng | |
| 5,595,074 A | 1/1997 | Munro | |
| 5,632,165 A | 5/1997 | Perry | |
| 5,709,110 A | 1/1998 | Greenfield et al. | |
| 5,836,183 A | 11/1998 | Derman | |
| 5,987,937 A | 11/1999 | Lee | |
| 6,006,557 A | 12/1999 | Carl et al. | |
| 6,166,910 A | 12/2000 | Ronberg et al. | |
| 6,216,499 B1 | 4/2001 | Ronberg et al. | |
| 6,386,906 B1 | 5/2002 | Burke | |
| 6,443,417 B2 * | 9/2002 | Galant | 248/553 |
| 7,007,912 B1 * | 3/2006 | Giuliani et al. | 248/552 |
| 7,014,002 B2 * | 3/2006 | Mizuta | 180/68.5 |

OTHER PUBLICATIONS

"Laptop Lockdown Code DCLDOWN", Davko Computer Locking Systems, issued Jun. 2003.
"Installation Instructions For The Protex Laptop Hold Down (LTHD-3)", Protex International Corp., Copyright 2001, pp. 1-4.
"Instructions For The Laptop Hold Down 4 (LT-HD4)", Protex International Corp., Copyright 2002, pp. 1-5.
"Instructions For DVD-HD DVD Player Hold Down", Protex International Corp., Copyright 2004, pp. 1-2.
"Laptop Hold Down Version 3", Assembly Instructions, Protex International Corp., undated, (2 pages).
Photographs of Phoenix Fixtures Product, Jun. 2000 (2 pages).

* cited by examiner

*Primary Examiner*—Anita M. King
(74) *Attorney, Agent, or Firm*—Collard & Roe, P.C.

(57) ABSTRACT

A retainer device for securing a displayed electronic device with a hinged member and a base portion to a support includes a grooved track secured to the support. First and second retainers are positionable in the track to define a space for the electronic device and include shoulder portions for engaging the grooved track and apertures for receiving elongated fasteners. First and second sets of spacers having complementary recesses and protrusions and through-holes for receiving the elongated fasteners are disposed over the retainers. A slotted member, through which the hinged member of the electronic device can be inserted, is supported by the first and second sets of spacers. Elongated fasteners are insertable through the slotted member and the sets of spacers and are engagable with the retainers for securing the electronic device to the support. A front grip secures a front of the base portion of the electronic device to the support.

23 Claims, 5 Drawing Sheets

LAPTOP COMPUTER SECURITY RETAINER DEVICE

BACKGROUND OF THE INVENTION

1. Field of the Invention

This invention relates to retainer devices for securing and preventing unauthorized removal of displayed items. In particular, the invention relates to a mechanical device for securing electronic devices having a hinged member and a base portion to a support.

2. The Prior Art

Devices for securing electronic equipment are known. For example, U.S. Pat. Nos. 6,166,910 and 5,052,651 relate to devices for securing computer equipment. U.S. Pat. Nos. 6,216,499; 6,006,557; 5,836,183; 5,709,110; 5,632,165; 5,595,074; 5,447,044; and 5,351,508 relate to devices for securing laptop personal computers. U.S. Pat. No. 5,987,937 relates to a device for locking peripheral devices to portable computers. U.S. Pat. No. 6,386,906 relates to a cord management apparatus for managing cords associated with small electronic devices on retail display.

SUMMARY OF THE INVENTION

The invention relates to a mechanical device for securing an electronic device having a hinged member and a base portion to a support.

A track is adapted to be secured to the support. The track may be grooved, perforated or otherwise adapted to receive one or more retainers. A first and second retainer are engagable in the track and include an aperture for receiving an elongated fastener. The first and second retainer are positionable in the track so as to define a space accommodating a base portion of the displayed electronic device. The first and second retainer may preferably include a shoulder portion for engaging a groove in the track.

A first and second set of spacers are disposed in a stacked manner over the first and second retainer respectively. Each set of spacers includes a plurality of spacers comprising a protrusion disposed on a first surface, a complementary recess disposed on a second surface and a through-hole for receiving an elongated fastener.

A slotted member, through which a hinged member of the electronic device may be inserted, is disposed over a selected one of the plurality of spacers from each of the first and second sets of spacers. The slotted member is supported by the first and second set of spacers and spans between the first and second retainer. Preferably, the slotted member spans between the retainers substantially parallel to the track, but the slotted member may also be disposed at an angle to the track.

First and second elongated fasteners are insertable through the slotted member and through first and second sets of spacers, respectively and are engagable with first and second retainers for securing the electronic device to the support.

A first and second cap having a through-hole for receiving the elongated fastener may be disposed over the respective first and second sets of spacers. The cap may have a recess disposed in a top surface of the cap. A fastener cover comprising a cup-shaped member having a through-hole for receiving an elongated fastener and a flexibly coupled top portion for concealing the elongated fastener may be disposed in the cap recess.

The retainer device may have a third set of spacers disposed over the support and a front grip disposed over a selected spacer from the third set of spacers. The third set of spacers and front grip may include a through-hole for receiving an elongated fastener. A bottom spacer of the third set of spacers may be secured to the support using, for example, a strip of double-sided adhesive tape, glue or other adhesives.

The front grip may be disposed over a front portion of the base portion of the electronic device and may be positionable so that it interferes with the functioning of the electronic device. Alternatively, the front grip may be positioned so that it does not interfere with the functioning of the electronic device.

A receiving element having an aperture for receiving an elongated fastener may be disposed under the support. The elongated fastener may be insertable through the front grip and third set of spacers and engagable with the receiving element to secure the electronic device to the support. Additionally, a segment of the track may be secured to a support at a front portion of the electronic device. The elongated fastener may be insertable through the front grip and third set of spacers and engagable with a retainer which engages the track. The elongated fasteners may be, for example, threaded fasteners and the apertures in the retainers and in the receiving element may be threaded apertures. The threaded fasteners may be tamper proof screws.

Additionally, a length of track may be secured to the support adjacent to a front portion of the electronic device. The front grip may be disposed over a selected spacer from the third group of spaces and a top cap disposed over the front grip. The front grip, spacer and top cap assembly may be secured to the track with an elongated fastener which extends through the top cap, front grip and spacers and engages a retainer which is engaged with the length of track in the manner as described for securing the slotted member.

The electronic device may be secured at one or both sides of the device with a side retainer assembly which may comprise one or more spacers, a side grip, top cap, and an elongated fastener which extends through the top cap, side grip, spacers and a through-hole in the support and engages a receiving element disposed on an underside of the support.

A rear portion of the electronic device may be secured with a rear retainer assembly which may comprise one or more spacers, a top cap, a rear grip and an elongated fastener which extends through the top cap, rear grip, spacers and a through-hole in the support and engages a receiving element disposed on an underside of the support. The rear grip may be positioned adjacent to a rear portion of the base of the electronic device so as not to interfere with the opening and closing of the hinged member of the electronic device. The rear retainer assembly may also be secured to a length of track in the manner of the front grip assembly or slotted member.

An advantage of a retainer device according to an embodiment of the invention is that a retainer device is provided which is easily installed and adjustable to accommodate displayed electronic devices of various proportions. Another advantage of a retainer device according to an embodiment of the invention is that a displayed electronic device may be secured such that its functioning or operation is either interfered with or not interfered with, depending on the requirements of a particular application for the retainer device.

A further advantage according to an embodiment of the invention is that an aesthetically pleasing retainer device is provided, wherein sets of stacked spacers of the same height may be associated with a number of displayed electronic devices of different heights.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
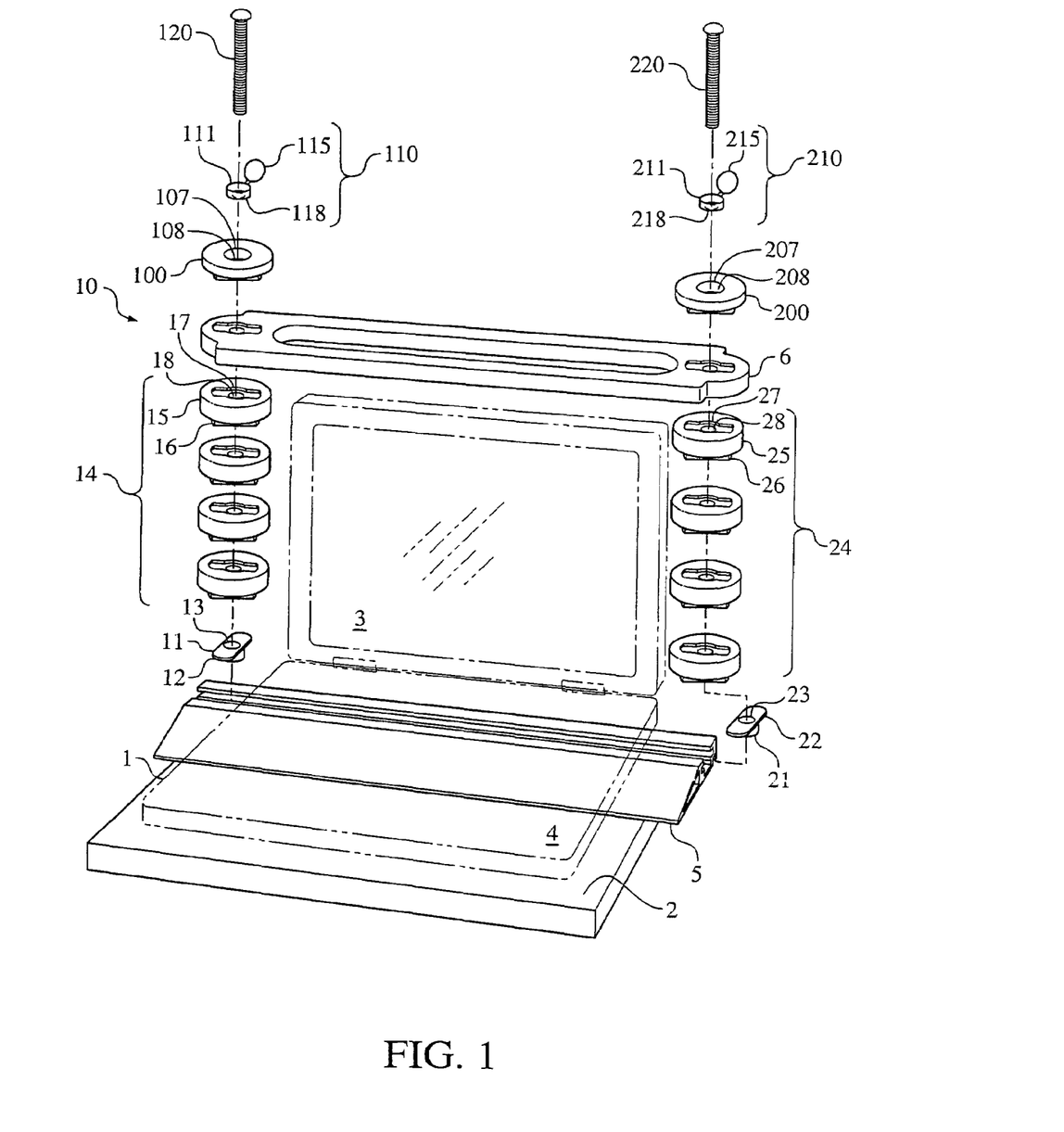
FIG. 1 shows a perspective view of retainer device according to an embodiment of the invention.

Referring now in detail to the drawings and, in particular, FIG. 1 shows a perspective view of a retainer device 10 for securing a displayed electronic device 1 to a support such as support 2. Displayed electronic device 1 has a hinged member 3 and a base portion 4. Electronic device 1 may comprise, for example, a laptop personal computer, a digital video disk (DVD) player or another hinged or clamshell-configured electronic device. Hinged member 3 may be a display screen portion of electronic device 1.

Support 2 may be, for example a countertop, table top, shelf or other object of sufficient size to deter unauthorized removal of an electronic device when secured thereto. Preferably, support 2 comprises a substantially flat, rigid surface.

In the embodiment shown in FIG. 1, retainer device 10 includes a track 5 adapted to be secured to support 2, first and second elongated fasteners 120, 220, first and second retainers 11, 21, a first set and a second set of spacers 14, 24 and a slotted member 6.

Preferably, track 5 is grooved, however, track 5 may include perforations that receive elongated fasteners 120, 220 at selected longitudinal locations. As shown in FIG. 1, track 5 is adapted to be secured to support 2. For example, track 5 may be screwed, bolted, adhered or otherwise fastened to support 2. Track 5 may extend in a lengthwise direction along support 2 and multiple displayed electronic devices may be secured using a single length of grooved track. Track 5 may be formed from any suitable material, for example, from extruded aluminum and may be provided in pre-cut lengths to fit standard shelf lengths or cut to custom lengths. Track 5 may have a cross sectional profile as illustrated in FIG. 1, wherein track 5 has a relatively narrow opening along a top surface and a relatively wider opening along an inner portion.

As shown in FIG. 1, a first retainer 11 and a second retainer 21 are positionable in track 5 so as to define a space which can accommodate a displayed electronic device 1. First and second retainers 11, 21 may be positioned at various distances from one another along track 5 and in this way displayed electronic devices of various sizes may be secured with a retainer device according to an embodiment of the invention.

As shown in FIG. 1, each of first and second retainers 11, 21 may engage track 5. For example, retainers 11, 21 may include an appropriately dimensioned shoulder portion 12, 22 for engaging track 5. Retainer shoulder portion may be configured, for example, so that retainers 11, 21 may be inserted into an opening in a top surface of track 5 from above with a major dimension of shoulder portion 12, 22 substantially parallel to a length of track 5. However, retainers 11, 21 may be constructed so as to engage track 5 by an interference fit or other suitable connection to prevent lateral or upward mobility of retainer device 10.

First and second retainer 11, 21 may also include an aperture portion 13, 23 for receiving elongated fasteners 120, 220. Aperture portion 13, 23 may have an internal thread for receiving and coupling with a threaded elongated fastener, such as a screw or bolt. An installation of an elongated fastener 120, 220 in retainer 11, 21 may locate and engage retainer 11, 21 in track 5.

For example, when elongated fastener 120, 220 is inserted through aperture portion 13, 23 of retainer 11, 21, elongated fastener 120, 220 may contact track 5 and retainer 11, 21 may move upwardly and rotate to within track 5. Retainer 11, 21 may rotate through an angle within a range of approximately 40-60 degrees, for example 45 degrees, with respect to a length of track 5. As retainer 11, 21 is rotated, shoulder portions 12 and 22 engage track 5. In this way, elongated fasteners 120, 220 may interface with retainers 11, 21 so as to automatically cause retainers 11, 21 to engage track 5.

First 14 and second 24 sets of spacers may be disposed over first 11 and 21 second retainers, respectively as shown in FIG. 1. Each set 14, 24 of spacers may include a plurality of spacers, such as spacers 15, 25, which are arranged in a stacked manner over each retainer 11, 21. Each individual spacer may be, for example, an annular disk with two substantially flat opposite surfaces having a protrusion on one surface and a complementary recess on an opposite surface. When spacers 15, 25 are stacked on top of one another, a protrusion 16, 26 of one spacer may fit into a recess 17, 27 of an adjacent spacer in a substantially interlocking manner. Spacers 15, 25 may be arranged so that protrusions 16, 26 face in a downward direction toward support 2 and complementary recesses 17, 27 face in an upward direction. Alternatively, spacers may be arranged so that a protrusion faces upward and a recess faces downward. Spacers 15, 25 may also include a through-hole 18, 28 extending through a thickness of spacer 15, 25 for receiving an elongated fastener 120, 220. Through-hole 18, 28 may be disposed at a center of spacer 15, 25.

A slotted member or screen bar 6 may be disposed over and supported by a selected spacer from first 14 and second 24 set of spacers. Slotted member 6 may be arranged so that it spans substantially between first 11 and second 21 retainer and extends substantially parallel with or at an angle to a length of track 5.

Slotted member 6 may be formed from a substantially rigid material, for example, molded plastic, extrusion grade ABS, wood, or any other suitable material. A slotted portion of slotted member 6 is dimensioned so that a hinged portion 3 of a displayed electronic device 1 is insertable through slotted member 6. Slotted member 6 may include through-holes at one or more ends of a slotted portion for receiving elongated fasteners 120, 220. Slotted member 6 may also include complementary recesses or protrusions on one or both sides for interlocking with a complementary protrusion or recess of an adjacent spacer or top cap.

Slotted member 6 may be positioned over any particular spacer in a stacked set of spacers, for example over a first spacer and under a second spacer, over a second spacer and under a third spacer, over a third spacer and under a fourth spacer or over a fourth spacer. In this way, a height of slotted member 6 relative to a displayed electronic device 1 is variable and slotted member 6 may be positioned at an appropriate height for a particular displayed electronic device.

Additionally, an equal number of spacers may be used to secure adjacently displayed electronic devices, irrespective of the height at which the slotted member is positioned for a particular displayed electronic device. In other words, the same number of spacers is used for both taller and shorter electronic devices. This feature provides a pleasing aesthetic appearance, as all sets of stacked spacers associated with a number of displayed electronic devices along a length of grooved track may be of the same height.

First cap 100 and second cap 200 may be disposed over slotted member 6 as shown in FIG. 1. First cap 100 and second cap 200 may each comprise an annular disk having a through-hole 108, 208 extending through a thickness of caps 100, 200 for receiving an elongated fastener 120, 220.

First cap 100 and second cap 200 may also include a recesses 107, 207 disposed on a top surface thereof and sized so that optional fastener covers 110, 210 may be disposed within recesses 107, 207. Recesses 107, 207 may comprise, for example, a counterbore extending from a top surface of a cap to a depth corresponding to a height of a fastener cover 110, 210 and having a diameter such that fastener cover 110, 210 may seated in the counterbored portion of the cap.

Fastener covers 110, 210 may include a cup-shaped member 111, 211 having a through-hole 118, 218 for receiving elongated fasteners 120, 220 and a top portion 115, 215 for concealing an elongated fastener 120, 220 inserted in caps 100, 200. Top portion 115, 215 may be hinged or otherwise flexibly coupled to cup-shaped member 111, 211 so that top portion 115, 215 may be opened to inert or remove an elongated fastener 120, 220 and closed to conceal an elongated fastener 120, 220.

First and second elongated fasteners 120, 220 may comprise tamper proof fasteners which require a specialized tool for insertion or removal. Such tamper proof fasteners are well known and may, for example, be a fastener having a modified Allen-wrench opening for turning the fastener. First and second elongated fasteners 120, 220 may be inserted through respective fastener covers 110, 210, top caps 100, 200, slotted member 6, and sets of spacers 14, 24 and be engaged with respective retainers 11, 21 to secure a displayed electronic device 1 to support 2. First and second elongated fasteners 120, 220 may comprise threaded elongated fasteners having a threaded section along at least a portion of their length, for example screws or bolts. Quarter turn-type fasteners could also be used as elongated fasteners in a retainer device according to an embodiment of the invention.

A height of slotted member 6 can be adjusted over a wide range in increments according to a thickness of a spacer. Longer or shorter elongated fasteners may be used depending on a desired height of slotted member as appropriate for a particular application. Elongated fasteners for use with a retainer device according to an embodiment of the invention may be provided in lengths which increase in proportion to a thickness of a spacer. A length of an elongated fastener measured from a bottom portion of a lowest spacer downward may remain the same regardless of a total length of the elongated fastener in order to facilitate an engagement of a retainer with the grooved track as disclosed above.

Figure 2:
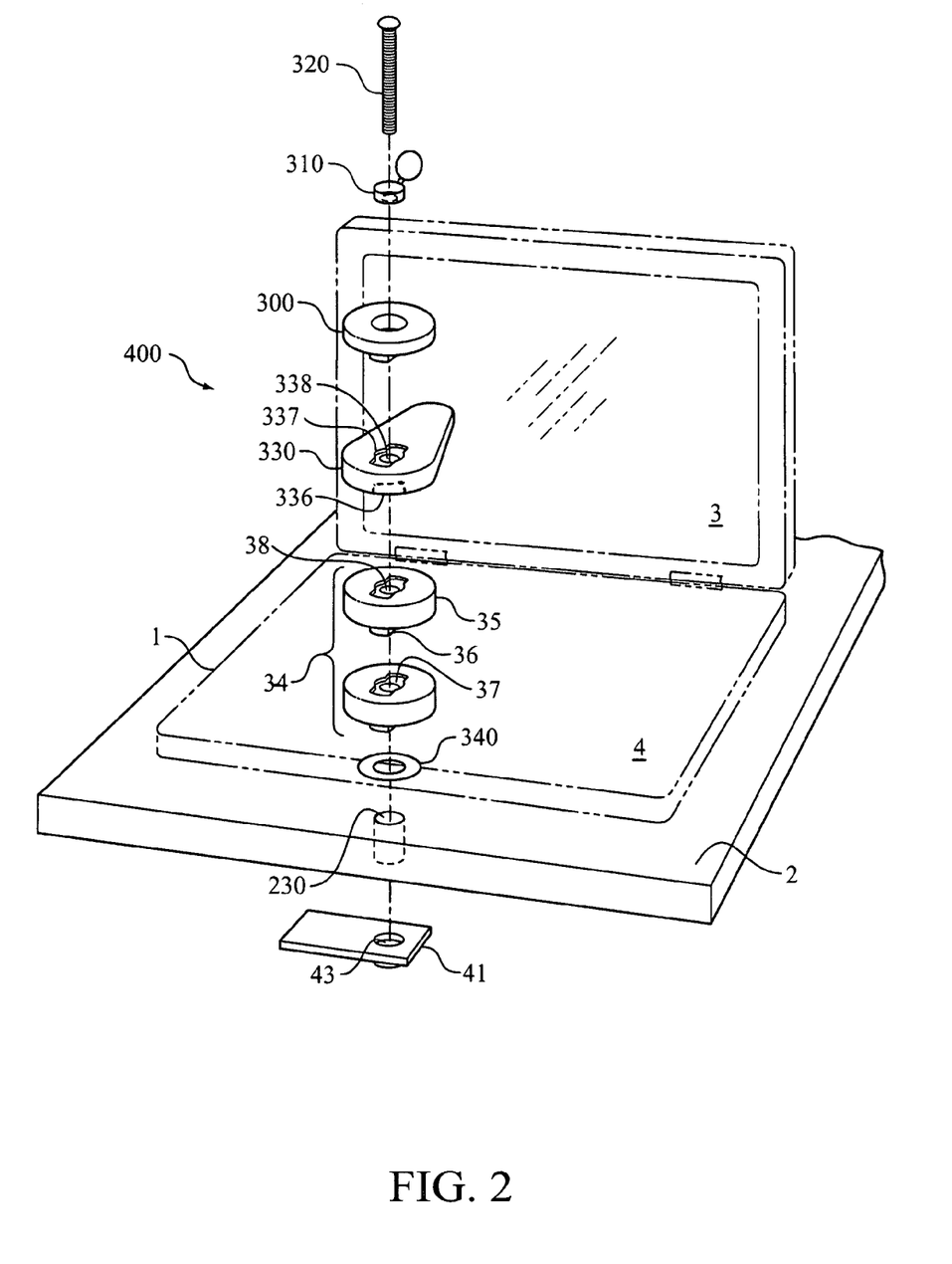
FIG. 2 shows a perspective view of a portion of a retainer device according to a further embodiment of the invention.

According to another embodiment, shown in part in FIG. 2, a retainer device such as is shown in FIG. 1 may include one or more retainer assemblies. In the embodiment shown in FIG. 2, one front retainer assembly 400 is shown, however one or more retainer assemblies may be provided on the front or sides or both in addition to or in place of front retainer 400 assembly shown in FIG. 2. As shown in FIG. 2, front retainer assembly 400 includes a receiving element 41, such as a bearing plate, disposed under support 2 and in front of a base portion 4 of a displayed electronic device 1. Preferably, receiving element 41 is substantially flat, but may also have other configurations if desired. Receiving element 41 may have an aperture 43 for receiving a third elongated fastener 320. Aperture 43 may preferably have an internal thread for receiving and coupling with a threaded elongated fastener; however it may also be formed without a thread.

As shown in FIG. 2, front retainer assembly 400 includes a third set of spacers 34 which may be disposed over support 2 and receiving element 41. Third set of spacers 34 may comprise a plurality of spacers 35 arranged in a stacked manner, each spacer having a protrusion 36 on one surface, a complementary recess 37 on an opposite surface and a through-hole 38 extending through its thickness for receiving a third elongated fastener 320. Spacers 35 may be arranged with a protrusion facing down and a recess facing up, as shown in FIG. 2, or alternatively with a protrusion facing up and a recess facing down. A bottom spacer may be secured to support 2 using a strip of double-sided adhesive tape 340, glue or other adhesives.

A front grip 330 may be disposed over a selected spacer from third set of spacers 34 and may be positioned over a front of base portion 4 of displayed electronic device 1. Preferably, front grip 330 is positioned such that the functioning of displayed electronic device 1, for example the opening of disk trays or bays or access to various controls or ports, is not interfered with or blocked. Alternatively, front grip 330 may be positioned such that such functioning of displayed electronic device 1 is intentionally interfered with or blocked.

Front grip 330 may have a through-hole 338 extending through its thickness for receiving a third elongated fastener 320. The height of front grip 330 may be adjusted by selecting an appropriate number of spacers or placing grip 330 over an appropriate spacer in third set of spacers 34. As shown, front grip 330 may have recesses 336, 337 on its top and bottom surfaces for interlocking with spacer 35 and/or top cap 300. Front grip may also include a protrusion on one or both sides or a protrusion on one side and a recess on an opposite side for interlocking with adjacent spacers and/or top caps.

A hole 230, for example an approximately $9/32$ inch diameter hole, may be drilled through support 2 so that third elongated fastener 320 may be inserted through support 2 and into receiving element 41.

Third elongated fastener 320 may comprise a tamper proof fastener which is insertable through front grip 330 and third set of spacers 34 and engagable with receiving element 41 to secure displayed electronic device 1 to support 2. Elongated fastener 320 may be a threaded or quarter turn or other suitable elongated fastener.

A front retainer assembly may also include a third top cap 300 and an optional third fastener cover 310 as shown in FIG. 2. Third top cap 300 and third fastener cover 310 are similar in construction to first and second top caps 100, 200 and first and second fastener covers 110, 210 described above.

Figure 3:
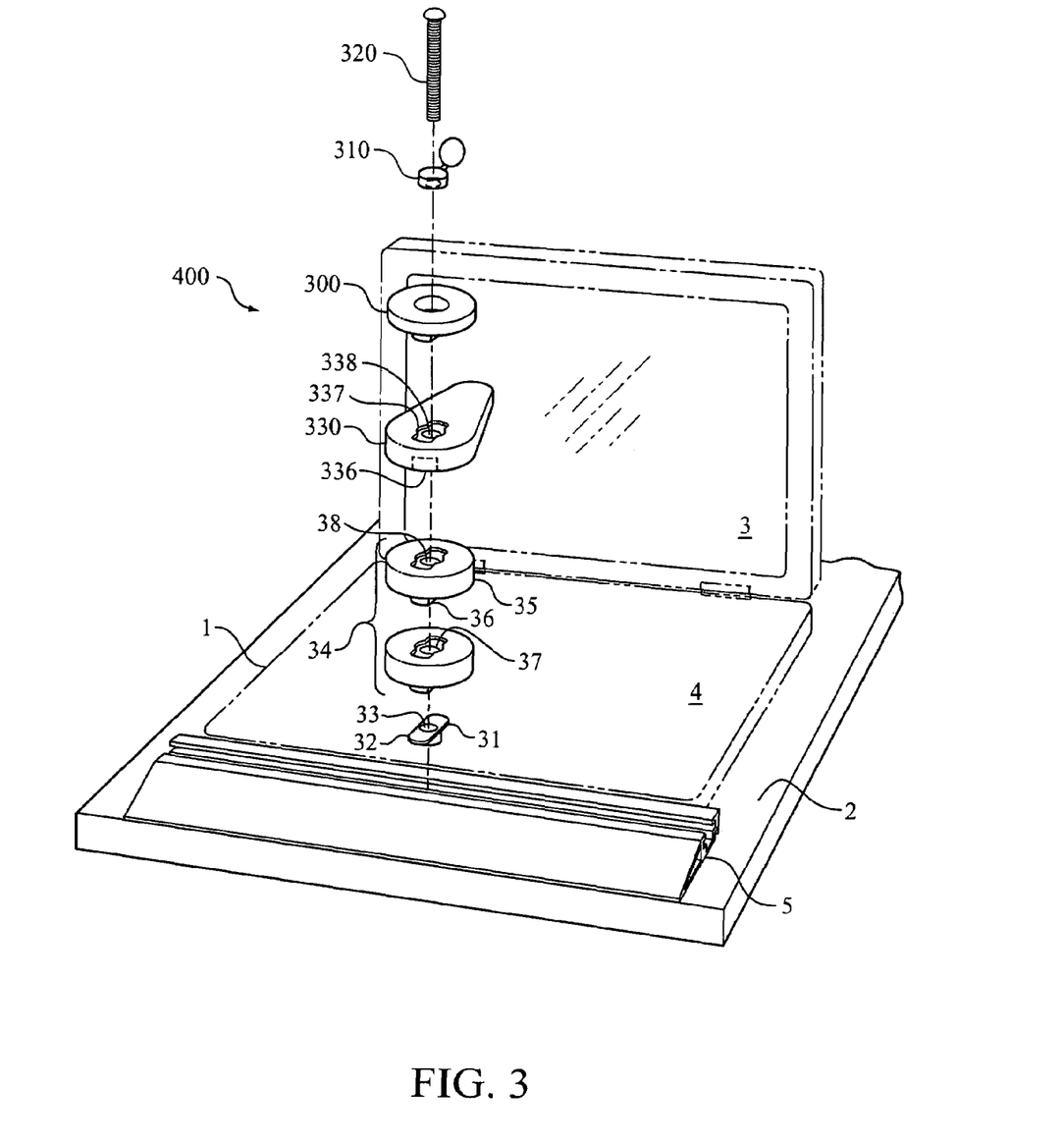
FIG. 3 shows a perspective view of a portion of a retainer device according to a further embodiment of the invention.

According to another embodiment, shown in part in FIG. 3, front retainer assembly 400 may be secured to a length of track 5 in the manner as described for slotted member 6 shown in FIG. 1. As shown in FIG. 3, a length of track 5 is secured to support 2 adjacent to a front portion of electronic device 1. A third elongated fastener 320 may be inserted through front grip 330, and third set of spacers 34 and engaged with a third retainer 31 which is disposed in a second length of track 5 positioned near a front of a base portion 4 of a displayed electronic device 1. Third retainer 31 may be similar to first and second retainer 11, 21 described above and may include a shoulder portion 32 and an aperture portion 33 and may engage a portion of track 5 in a likewise manner.

Figure 4:
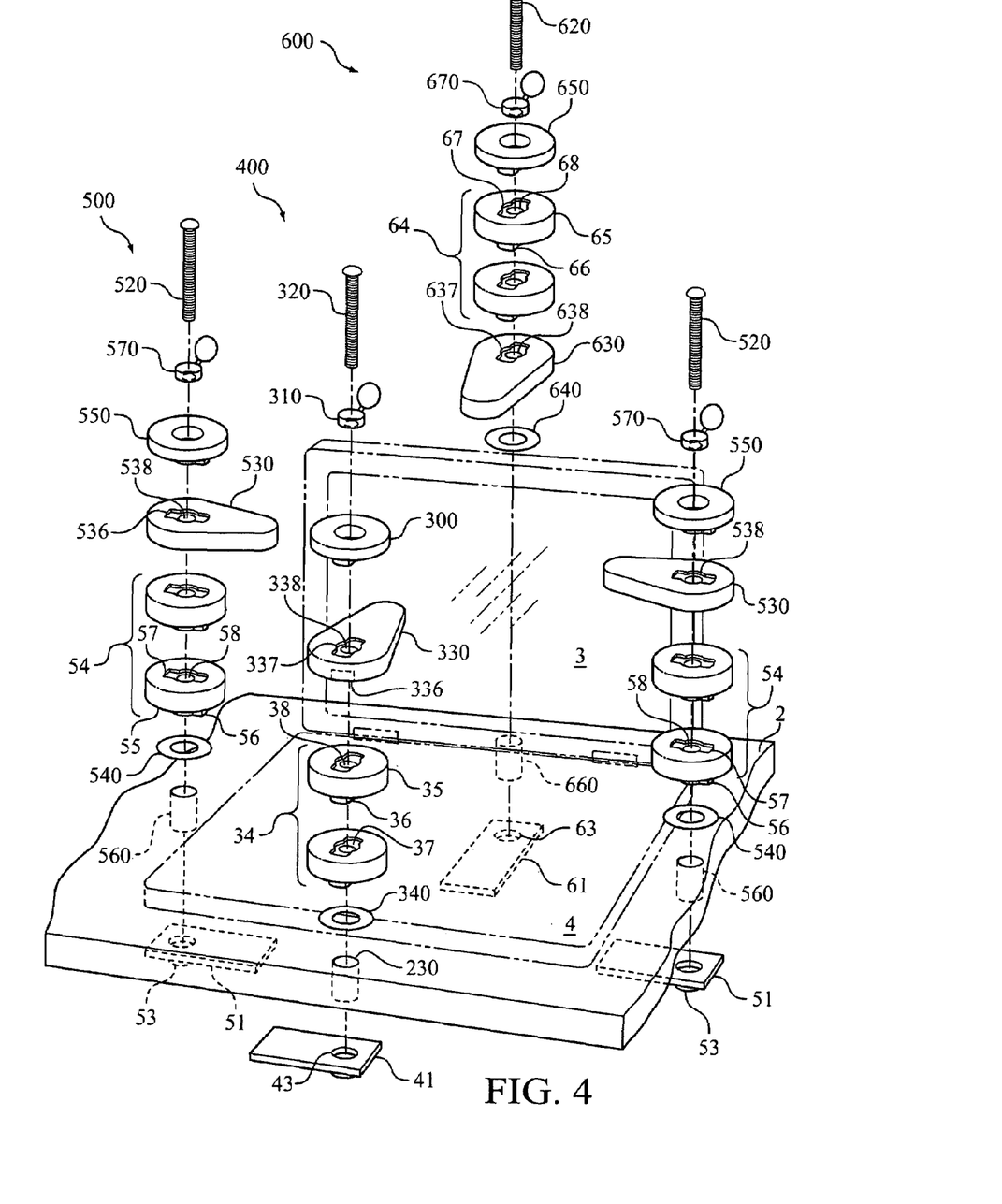
FIG. 4 shows a perspective view of a retainer device according to another embodiment of the invention.
Figure 5:
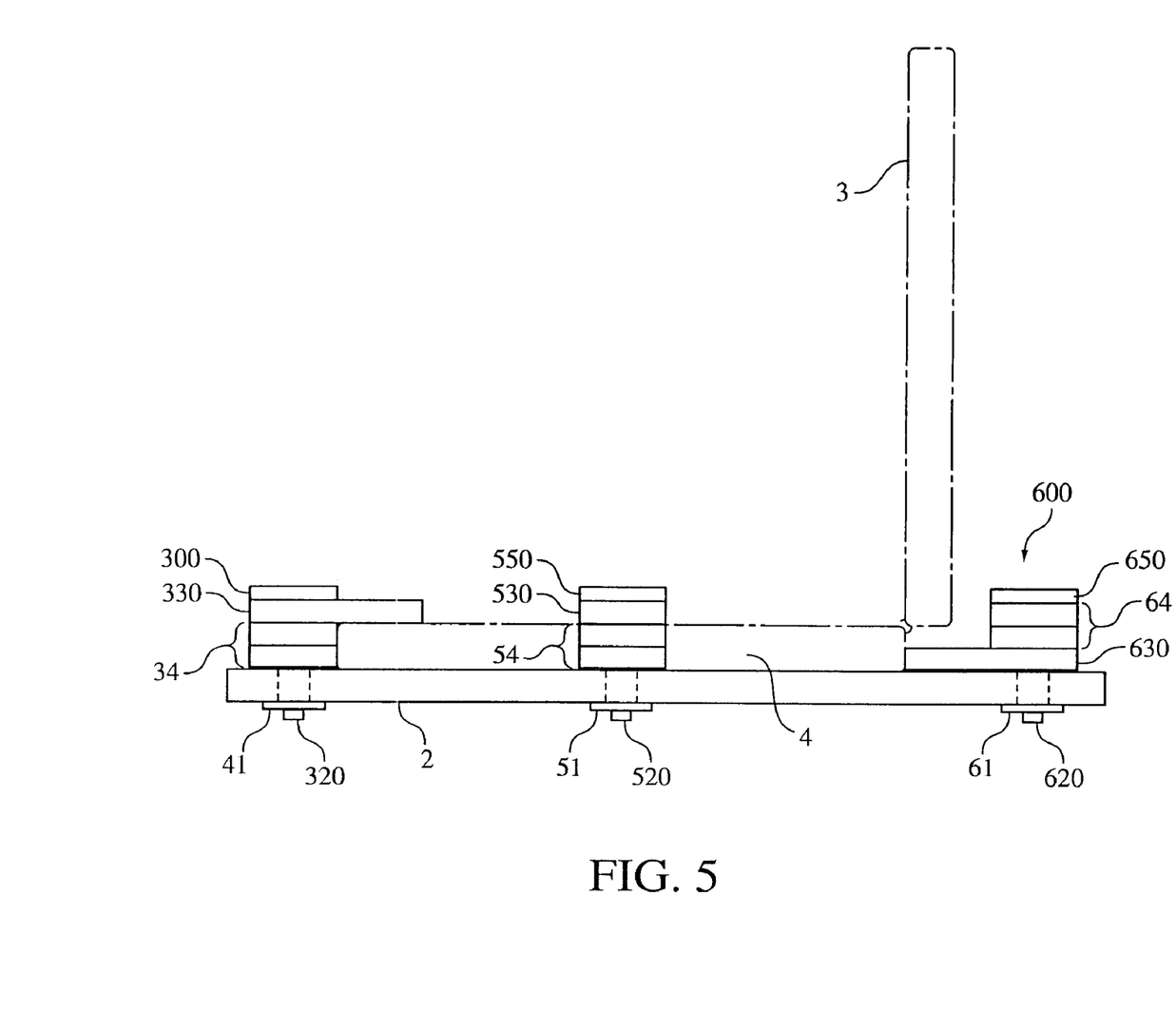
FIG. 5 shows a side view of the retainer device shown in FIG. 4.

Another embodiment of a retainer device is shown in FIGS. 4 and 5. As shown in FIG. 4, in addition to or in place of front retainer assembly 400, the retainer device may comprise one or more side retainer assemblies 500 disposed at one or more sides of base 4 of the electronic device. As shown in FIG. 4, each side retainer assembly 500 may include a receiving element 51, such as a bearing plate, disposed under support 2 and having an aperture 53 for receiving an elongated fastener 520. Preferably, receiving element 51 is substantially flat, but may also have other configurations if desired. Aperture 53 may include an internal thread for receiving and coupling with a threaded elongated fastener or may be formed without a thread.

As shown in FIG. 4, side retainer assembly 500 includes a set of spacers 54 which may be disposed over support and 2 and receiving element 51. Spacer set 54 may comprise a plurality of spacers 55 arranged in a stacked manner, each spacer having a protrusion 56 on one surface, a complementary recess 57 on an opposite surface and a through hole 58 extending through its thickness for receiving an elongated fastener 520. Spacers 55 may be arranged with a protrusion facing down and a recess facing up, as shown in FIG. 4, or alternatively with a protrusion facing up and a recess facing down. A bottom spacer may be secured to support 2 using a strip of double-sided adhesive tape 540, glue or other adhesives.

A side grip 530 may be disposed over a selected spacer from spacer set 54 and may be positioned adjacent to or over a side portion of base 4 of displayed electronic device 1. Side grip 530 may have a through-hole 538 extending through its thickness for receiving elongated fastener 520. A height of side grip 530 may be adjusted by selecting an appropriate number of spacers or placing side grip 530 over an appropriate spacer in set of spacers 54. As shown in FIG. 4, side grip 530 may have recesses 536 on its top and bottom surfaces for interlocking with spacer 55 and/or top cap 550. Side grip 530 may also include a protrusion on one or both sides or a protrusion on one side and a recess on an opposite side for interlocking with adjacent spacers and/or top caps.

A hole 560, for example an approximately 9/32 inch diameter hole, may be drilled through support 2 so that elongated fastener 520 may be inserted through support 2 and into receiving element 51.

Elongated fastener 520 may comprise a tamper proof fastener which is insertable through side grip 530 and set of spacers 54 and engagable with receiving element 51 to secure displayed electronic device 1 to support 2. Elongated fastener 520 may be a threaded or quarter turn or other suitable elongated fastener.

Side retainer assembly 500 may also include a top cap 550 and an optional fastener cover 570 as shown in FIG. 4. Top cap 550 and fastener cover 570 are similar in construction to first and second top caps 100, 200 and first and second fastener covers 110, 210, described above.

In a further embodiment, a slotted member 6, as shown in FIG. 1, may be substituted for the side grips 530 of the two side retainer assemblies 500 shown in FIG. 4. In this embodiment, each side retainer assembly 500 may include a receiving element 51, such as a bearing plate, disposed under support 2 and having an aperture 53 for receiving an elongated fastener 520 and a set of spacers 54 which may be disposed over support and 2 and receiving element 51.

Spacer set 54 may comprise a plurality of spacers 55 arranged in a stacked manner, each spacer having a protrusion 56 on one surface, a complementary recess 57 on an opposite surface and a through hole 58 extending through its thickness for receiving an elongated fastener 520. Spacers 55 may be arranged with a protrusion facing down and a recess facing up, as shown in FIG. 4, or alternatively with a protrusion facing up and a recess facing down. A bottom spacer may be secured to support 2 using a strip of double-sided adhesive tape 540, glue or other adhesives.

Spacer sets 54 and receiving elements 51 may be arranged on either side of base 4 of electronic device 1 and adjacent to hinged member 3. A slotted member 6, as shown in FIG. 1 may be disposed over and supported by a selected spacer from each spacer set 54. Slotted member 6 may be arranged so that it spans substantially between spacer sets 54 and so that a hinged portion 3 of a displayed electronic device 1 is insertable through slotted member 6.

A height of slotted member 6 may be adjusted by selecting an appropriate number of spacers or placing slotted member 6 over an appropriate spacer in set of spacers 54. Slotted member 6 may have recesses on its top and bottom surfaces for interlocking with spacer 55 and/or top cap 550. Slotted member 6 may also include a protrusion on one or both sides or a protrusion on one side and a recess on an opposite side for interlocking with adjacent spacers and/or top caps.

A hole 560, for example an approximately 9/32 inch diameter hole, may be drilled through support 2 so that elongated fastener 520 may be inserted through support 2 and into receiving element 51.

Elongated fastener 520 may comprise a tamper proof fastener which is insertable through slotted member 6 and set of spacers 54 and engagable with receiving element 51 to secure displayed electronic device 1 to support 2. Elongated fastener 520 may be a threaded or quarter turn or other suitable elongated fastener.

As shown in FIG. 4, the retainer device may include one or more rear retainer assemblies 600 disposed at a rear portion of base 4 of displayed electronic device 1. Rear retainer assembly 600 may include a receiving element 61, such as a bearing plate, disposed under support 2 and having an aperture 63 for receiving an elongated fastener 620. Preferably, receiving element 61 is substantially flat, but may also have other configurations if desired. Aperture 63 may include an internal thread for coupling with a threaded elongated fastener or may be formed without a thread.

As further shown in FIG. 4, rear retainer assembly 600 includes a set of spacers 64 which may be disposed over support 2 and receiving element 61. Spacer set 64 may comprise a plurality of spacers 65 arranged in a stacked manner, each spacer having a protrusion 66 on one surface, a complementary recess 67 on an opposite surface and a through-hole 68 extending through its thickness for receiving elongated fastener 620. Spacers 65 may be arranged with a protrusion facing down and a recess facing up, as shown in FIG. 4, or alternatively with a protrusion facing up and a recess facing down. A bottom spacer may be secured to support 2 using a strip of double-sided adhesive tape 640, glue or other adhesives.

A rear grip 630 may be disposed adjacent to a rear portion of base 4 of displayed electronic device 1. As shown in the side view of a retainer device shown in FIG. 5, rear retainer assembly 600 is preferably positioned so that it does not interfere with a pivoting or movement of hinged portion 3 of displayed electronic device 1. For example rear grip 630 may be positioned flush with support 2 and butting up against base 4 of displayed electronic device 1. Rear grip 630 may have a through hole 638 extending through its thickness for receiving elongated fastener 620. A height of rear grip 630 may be adjusted by selecting an appropriate number of spacers or placing rear grip 630 over an appropriate spacer in set of spacers 64. As shown, rear grip 630 may have recesses 637 on its top and bottom surfaces for interlocking with spacer 65 and/or top cap 650. Rear grip 630 may also include a protrusion on one or both sides or a protrusion on one side and a recess on an opposite side for interlocking with adjacent spacers and/or top caps.

A hole 660, for example an approximately 9/32 inch diameter hole, may be drilled through support 2 so that elongated fastener 620 may be inserted through support 2 and into receiving element 61.

Elongated fastener 620 may comprise a tamper proof fastener which is insertable through rear grip 630 and set of spacers 64 and engagable with receiving element 61 to secure displayed electronic device 1 to support 2. Elongated fastener 620 may be a threaded or quarter turn or other suitable elongated fastener.

A rear retainer assembly 600 may also include a top cap 650 and an optional fastener cover 670 as shown in FIG. 4. Top cap 650 and fastener cover 670 are similar in construction to first and second top caps 100, 200 and first and second fastener covers 110, 210 as described above.

Rear retainer assembly 600 may alternatively be secured to a length of track secured to support 2 adjacent to a rear of electronic device 1. In this embodiment rear retainer assembly 600 is secured to a length of track using a retainer in the manner as described for slotted member 6 and shown in FIG. 1 and as described for front retainer assembly 400 and shown in FIG. 3.

The slotted member assembly 10 shown in FIG. 1 may be used in combination with either of the front retainer assemblies shown in FIGS. 2 and 3 and/or in combination with the side and/or rear retainer assemblies shown in FIGS. 4 and 5. Furthermore, the side and/or rear retainer assemblies shown in FIG. 4 may be used in combination with the front retainer assembly 400 shown in FIG. 3.

Additionally, electronic device 1 may be positioned on a support which includes a substantially vertical back portion in which case rear retainer assembly 600 may not be required and electronic device 1 may be secured using front 400 and side 500 retainer assemblies.

Accordingly, while several embodiments of the present invention have been shown and described, it is obvious that many changes and modifications may be made thereunto without departing from the spirit and scope of the invention.

What is claimed is:

1. A retainer device for securing a displayed electronic device having a hinged member and a base portion to a support, the retainer device comprising:
    (a) a track adapted to be secured to the support;
    (b) first and second elongated fasteners;
    (c) first and second retainers positionable in said track to define a space accommodating the base portion of the electronic device, each of said first and second retainers engaging said track and having an aperture for receiving one of said first and second elongated fastener;
    (d) a first set and a second set of spacers, said first set of spacers disposed over said first retainer in a stacked manner and said second set of spacers disposed over said second retainer in a stacked manner, wherein each of said first set and said second set of spacers comprises a plurality of spacers, each spacer of said plurality of spacers comprising a protrusion disposed on a first surface, a complementary recess disposed on a second surface, and a through-hole for receiving one of said first and said second elongated fasteners; and
    (e) a slotted member disposed over a selected one of said plurality of spacers in each of said first set and said second set of spacers, said slotted member being supported by said first set and said second set of spacers, wherein the hinged member of the electronic device is insertable through said slotted member;
    wherein each of said first and said second elongated fastener is insertable through said slotted member and a respective one of said first set and second set of spacers and each of said first and said second elongated fastener is engagable with a respective one of said first and said second retainer to secure the electronic device to the support.

2. The retainer device according to claim 1 wherein said track comprises a grooved track.

3. The retainer device according to claim 2, wherein each of said first and said second retainer further comprises a shoulder portion for engaging said grooved track.

4. The retainer device according to claim 1, further comprising a first cap disposed over said first set of spacers and having a through-hole for receiving said first elongated fastener, and a second cap disposed over said second set of spacers and having a through-hole for receiving said second elongated fastener.

5. The retainer device according to claim 4, wherein each of said first cap and said second cap further comprises a recess disposed in a respective top surface of said first cap and said second cap.

6. The retainer device according to claim 5, further comprising a first fastener cover disposed in said recess of said first cap and a second fastener cover disposed in said recess of said second cap, each of said first and said second fastener cover comprising a cup-shaped member having a through-hole for receiving a respective one of said first and said second elongated fastener and a top portion flexibly coupled to said cup-shaped member for concealing the respective one of said first and said second elongated fastener.

7. The retaining device according to claim 1, further comprising:
    (a) a third elongated fastener;
    (b) a receiving element disposed under the support and having an aperture for receiving said third elongated fastener;
    (c) a third set of spacers disposed over the support in a stacked manner, wherein said third set of spacers comprises a plurality of spacers, each spacer of said plurality of spacers comprising a protrusion disposed on a first surface, a complementary recess disposed on a second surface, and a through-hole for receiving said third elongated fastener; and (d) a front grip disposed over a selected one of said plurality of spacers of said third set of spacers and over a front portion of the base portion of the electronic device and having a through-hole for receiving said third elongated fastener;

wherein said third elongated fastener is insertable through said front grip and said third set of spacers and engagable with said receiving element to secure the electronic device to the support.

8. The retainer device according to claim 7, wherein said front grip is positionable such that said front grip does not interfere with a functioning of the electronic device.

9. The retainer device according to claim 7, wherein said front grip is positionable such that said front grip interferes with a functioning of the electronic device.

10. The retainer device according to claim 7, wherein said third elongated fastener comprises a threaded elongated fastener and said receiving element aperture comprises a threaded aperture.

11. The retainer device according to claim 10, wherein said threaded elongated fastener comprises a tamper proof screw.

12. The retainer device according to claim 1, wherein said track is formed from extruded aluminum.

13. The retainer device according to claim 1, wherein said slotted member comprises a plastic material.

14. The retainer device according to claim 1, wherein said slotted member comprises a wood material.

15. The retainer device according to claim 1, wherein each of said first and said second elongated fastener comprise a threaded elongated fastener and said aperture comprises a threaded aperture.

16. The retainer device according to claim 15, wherein each of said first and said second threaded elongated fastener comprises a tamper proof screw.

17. The retainer device according to claim 1, wherein said plurality of spacers are arranged with said protrusion of each spacer facing down and said complementary recess facing up.

18. The retainer device according to claim 1, further comprising:

(a) a third elongated fastener;

(b) a length of track secured to the support at a front portion of the base portion of the displayed electronic device;

(c) a third set of spacers disposed over the support in a stacked manner, wherein said third set of spacers comprises a plurality of spacers, each spacer of said plurality of spacers comprising a protrusion disposed on a first surface, a complementary recess disposed on a second surface, and a through-hole for receiving said third elongated fastener;

(d) a third retainer positionable in and engaging said length of track and having an aperture for receiving said third elongated fastener; and (e) a front grip disposed over a selected one of said plurality of spacers of said third set of spacers and over said front portion of the base portion of the electronic device and having a through-hole for receiving said third elongated fastener;

wherein said third elongated fastener is insertable through said front grip and said third set of spacers and engagable with said third retainer to secure the electronic device to the support.

19. The retainer device according to claim 18, wherein said front grip is positionable such that said front grip does not interfere with a functioning of the electronic device.

20. The retainer device according to claim 18, wherein said front grip is positionable such that said front grip interferes with a functioning of the electronic device.

21. The retainer device according to claim 18, wherein said third elongated fastener comprises a threaded elongated fastener and said aperture comprises a threaded aperture.

22. The retainer device according to claim 21, wherein said threaded elongated fastener comprises a tamper proof screw.

23. A retainer device for securing a displayed electronic device having a hinged member and a base portion to a support, the retainer device comprising:

(a) a track adapted to be secured to the support;

(b) first and second elongated fasteners;

(c) a first set and a second set of spacers, said first set of spacers disposed over said track in a stacked manner on a side of the electronic device and said second set of spacers disposed over said track in a stacked manner on another side of the electronic device, wherein each of said first set and said second set of spacers comprises a plurality of spacers, each spacer of said plurality of spacers comprising a protrusion disposed on a first surface, a complementary recess disposed on a second surface, and a through-hole for receiving one of said first and said second elongated fasteners; and (d) a slotted member disposed over a selected one of said plurality of spacers in each of said first set and said second set of spacers, said slotted member being supported by said first set and said second set of spacers, wherein the hinged member of the electronic device is insertable through said slotted member;

wherein each of said first and said second elongated fastener is insertable through said slotted member and a respective one of said first set and said second set of spacers and engagable with said track to secure the electronic device to the support.

* * * * *